(12) United States Patent
Thiesse

(10) Patent No.: US 10,494,773 B1
(45) Date of Patent: Dec. 3, 2019

(54) PAVING MACHINE WITH AN EMULSION TANK LEVEL SENSOR

(71) Applicant: Caterpillar Paving Products Inc., Brooklyn Park, MN (US)

(72) Inventor: Chad M. Thiesse, Brooklyn Park, MN (US)

(73) Assignee: Caterpillar Paving Products Inc., Brooklyn Park, MI (US)

( * ) Notice: Subject to any disclaimer, the term of this patent is extended or adjusted under 35 U.S.C. 154(b) by 0 days.

(21) Appl. No.: 16/202,956

(22) Filed: Nov. 28, 2018

(51) Int. Cl.
*E01C 19/00* (2006.01)
*E01C 19/17* (2006.01)
*B60K 15/03* (2006.01)
*E02F 9/26* (2006.01)

(52) U.S. Cl.
CPC .......... *E01C 19/176* (2013.01); *B60K 15/03* (2013.01); *E02F 9/267* (2013.01); *B60K 2015/03217* (2013.01)

(58) Field of Classification Search
CPC ........ E01C 19/176; E02F 9/267; B60K 15/03; B60K 2015/03217
USPC ........................... 404/84.05, 111, 118
See application file for complete search history.

(56) References Cited

U.S. PATENT DOCUMENTS

| | | | | |
|---|---|---|---|---|
| 5,149,440 A | * | 9/1992 | Moller | B01D 17/047 210/708 |
| 5,540,518 A | * | 7/1996 | Wambold | E01C 23/163 404/84.05 |
| 5,544,971 A | * | 8/1996 | Huege | E01C 7/187 404/72 |
| 5,681,148 A | * | 10/1997 | Friedman | B63B 29/16 4/431 |
| 5,735,634 A | * | 4/1998 | Ulrich | E01C 19/48 404/102 |
| 2005/0117970 A1 | * | 6/2005 | Gaertner | B60K 11/08 404/93 |
| 2009/0285631 A1 | * | 11/2009 | Buschmann | E01C 19/48 404/108 |
| 2015/0259864 A1 | * | 9/2015 | Roy | E01C 19/1004 404/77 |
| 2019/0105960 A1 | * | 4/2019 | Dudar | B60G 17/0165 |

FOREIGN PATENT DOCUMENTS

| | | |
|---|---|---|
| CN | 205045282 U | 2/2016 |
| CN | 205934662 U | 2/2017 |
| DE | 102015015793 A1 | 6/2017 |
| JP | 2012046990 A | 3/2012 |

* cited by examiner

Primary Examiner — Raymond W Addie
(74) Attorney, Agent, or Firm — Bookoff McAndrews

(57) ABSTRACT

A paving machine includes an operator station including an operator display, a hopper to store paving material, a conveyor system to transfer the paving material to a dispersion system, and an emulsion system. The emulsion system includes an emulsion tank to store and dispense emulsion fluid, a sensor to measure a level of emulsion fluid, and a light indicator located in a forward line of sight from the operator station and including a first light portion signaling a tank full condition, and second light portion signaling an tank low condition.

20 Claims, 2 Drawing Sheets

PAVING MACHINE WITH AN EMULSION TANK LEVEL SENSOR

TECHNICAL FIELD

The present disclosure relates generally to a road construction machine, and more particularly, to a paving machine with an emulsion tank level sensor system.

BACKGROUND

The present disclosure relates to paving machines that are used in road surface construction and repairs. Paving machines are typically utilized to lay asphalt or other paving material. Paving machines may include various tanks that supply fluids for the paving process. For example, a paving machine may include an emulsion tank that stores an emulsion fluid or pre-coating tack that is sprayed on the existing ground or road surface to aid in the bonding of the new paving material. Given the tacky nature of the treatment fluid, it can be problematic to clean spills of the emulsion fluid on the paving machine and ground, such as when a tank is over filled. Further, it is important to know when the emulsion fluid in the emulsion tank is running low to avoid interrupting the paving process due to insufficient fluid in the emulsion tank.

DE 102015015793 A1 (the '793 publication") discloses a fluid level indicator for fluid tanks on construction machines. In particular, the '793 publication discloses a level indicator having a linear array of LEDs located on a side wall of the construction machine that indicates the fluid level in a respective fluid tank. The linear array of LEDs are all lit when the tank is full, and LEDs are turned off from the top of the array as the fluid level in the tank lowers. The fluid level indicator of the '793 publication, however, may be insufficient in fully informing the machine operator of the fill status of the fluid tank.

The paving machine of the present disclosure may address or solve one or more of the problems set forth above and/or other problems in the art. The scope of the current disclosure, however, is defined by the attached claims, and not by the ability to solve any specific problem.

SUMMARY

In accordance to one aspect of this disclosure, a paving machine includes an operator station including an operator display, a hopper to store paving material, a conveyor system to transfer the paving material to a dispersion system, and an emulsion system. The emulsion system includes an emulsion tank to store and dispense emulsion fluid, a sensor to measure a level of emulsion fluid, and a light indicator located in a forward line of sight from the operator station and including a first light portion signaling a tank full condition, and second light portion signaling an tank low condition.

In accordance with another aspect of this disclosure, a paving machine includes an operator station including an operator display, a hopper to store paving material, a conveyor system to transfer the paving material to dispersion system, and an emulsion system. The emulsion system includes an emulsion tank to store and dispense emulsion fluid, a sensor to measure a level of emulsion fluid, a light indicator located in a forward line of sight from the operator station, extending vertically, and located above the emulsion tank, the light indicator including a first light portion signaling a tank full condition, and second light portion signaling an tank low condition, and an alarm configured to sound when the first light portion is lit and when the second light portion is lit. The operator display includes an indication of the level of emulsion in the emulsion tank.

In accordance with yet another aspect of this disclosure, a paving machine includes an operator station, a hopper to store paving material, a conveyor system to transfer the paving material to dispersion system, and an emulsion system. The emulsion system includes an emulsion tank to store and dispense emulsion fluid, a sensor to measure a level of emulsion fluid, a light indicator extending vertically, and located above the emulsion tank, the light indicator including a first light portion of a first color signaling a tank full condition, and a second light portion of a second color signaling an tank low condition, and an alarm configured to sound when the first light portion is lit and when the second light portion is lit. The paving machine further includes a display including an indicator of the level of emulsion in the tank.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

For the purpose of this disclosure, the term "ground surface" is broadly used to refer to all types of surfaces that form typical roadways (e.g., asphalt, cement, clay, sand, dirt, etc.) or upon which paving material may be deposited in the formation of roadways. In this disclosure, relative terms, such as, for example, "about," "substantially," and "approximately" are used to indicate a possible variation of ±10% in a stated value. Although the current disclosure is described with reference to a paving machine, this is only exemplary. In general, the current disclosure can be applied as to any machine, such as, for example, a paver finisher, asphalt finisher, or another paving-type machine having a fluid tank.

Figure 1:
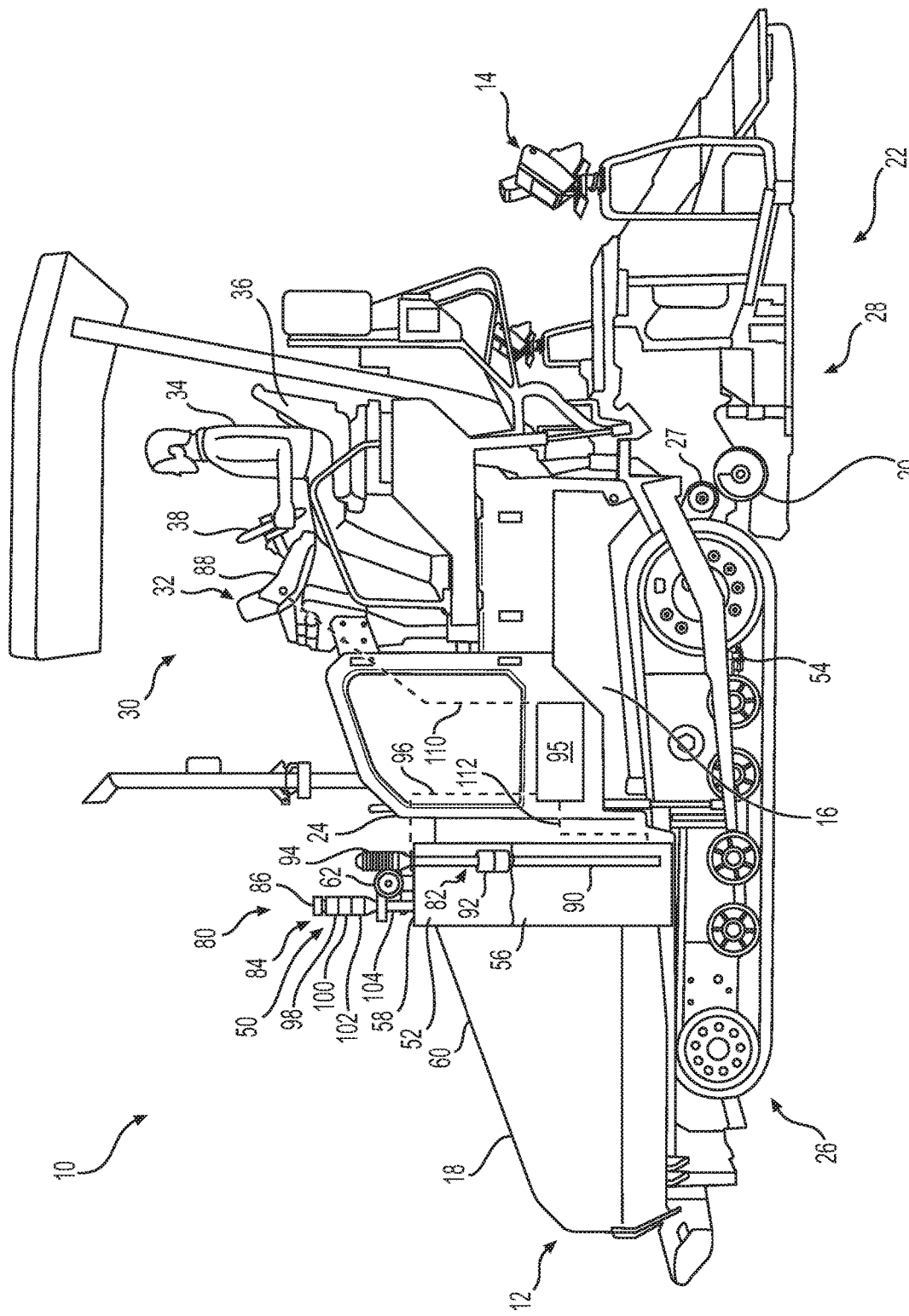
FIG. 1 is an illustration of an exemplary paving machine according to aspects of this disclosure.

FIG. 1 illustrates a side view of an exemplary paving machine 10, according to the present disclosure. Machine 10 may be a small paver, for example, with a maximum paving width of approximately 5.5 meters and having a forward end 12 and a rear end 14. Machine 10 includes a frame 16, a hopper 18, an auger 20, and a screed 22. Machine 10 may also include an operator station 30, including one or more control panels (controls and displays) 32 to maneuver, control, and monitor machine 10. Machine 10 may include an engine assembly 24 to power a drive assembly 26 having a track on each side of machine 10.

Hopper 18 is positioned at the forward end 12 of paving machine 10 to receive or store the paving material, for example, from a mixer truck. A conveyor system 27 (partially shown) connects hopper 18 to a dispersion system 28 in a rear portion of frame 16 to convey the paving material. The conveyor assembly may extend beneath engine assembly 24 and operator station 30.

Paving machine 10 may include a dispersion system 28 including at least one auger 20 and at least one screed 22. Auger 20 may be positioned perpendicular to the direction of travel of paving machine 10. Additionally, auger 20 may include a plurality of parallel or longitudinally arranged auger sections. Screed 22 is positioned to the rear of auger 20, and smoothes the paving material delivered by auger 20 to the ground surface. The height of screed 22 may be adjustable, for example, via control panel 32. Operator station 30 may include a steering wheel 38 and a plurality of user interfaces, including control panel 32, in order for an operator 34 to steer paving machine 10, control a rate of delivery of the paving material, adjust the height of screed 22, etc.

Figure 2:
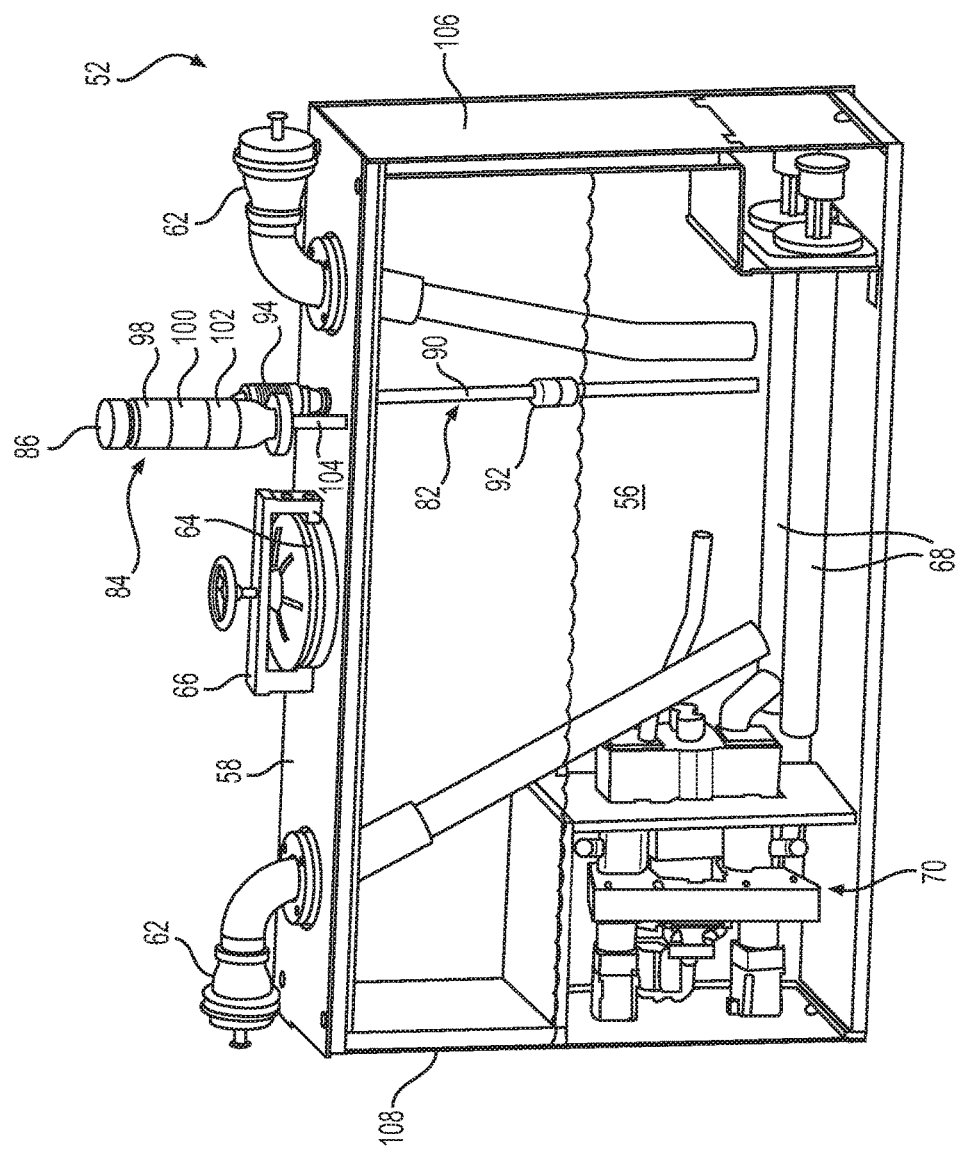
FIG. 2 is a perspective view of an exemplary emulsion tank with level indicator system on the paving machine of FIG. 1.

Machine 10 may also include an emulsion system 50 including, for example, an emulsion tank 52 an emulsion circuit (not shown), and one or more spray bars 54. Emulsion tank 52 may receive and store treatment fluid such as an emulsion fluid, pre-coating tack, or other binding material 56 to be delivered to the ground surface by the one or more spray bars 54 prior to delivery of the paving material via auger 20 and screed 22. As used herein, emulsion fluid, pre-coating tack, or other binding material of the emulsion system will be collectively referred to as emulsion fluid 56. The emulsion tank 52 may be located adjacent and immediately behind the hopper 18, and located forward of the operator station 30. The emulsion tank 52 may have a top surface 58 vertically higher than a top-most portion 60 of the hopper 18, and the top surface 58 of emulsion tank 52 may be in a line of sight from the operator station 30. As used herein, the phrase "line of sight from the operator station" corresponds to a field of vision of an operator 34 of the paving machine 10 when looking in a straight forward direction and sitting in an operator chair 36 of the paving machine 10. As shown in FIGS. 1 and 2, the emulsion tank 52 may have a rectangular shape, and may extend from one side of paving machine 10 to an opposite side of paving machine 10.

Referring again to FIGS. 1 and 2, the emulsion tank 52 may include one or more inlets 62, for example, one inlet 62 positioned on either side of emulsion tank 52 to allow fill hoses (not shown) to be connected thereto for filling of tank 52 from either side of paving machine 10. Emulsion tank 52 may also include an access hatch 64, which may be opened to access the interior of tank 52. Access hatch 64 may be positioned between inlets 62, and may be secured in a closed position by a locking bar 66. The interior of emulsion tank 52 may include one or more controllable heaters 68 to maintain the emulsion fluid 56 at appropriate temperatures for spraying. The emulsion tank 52 may further include a pump system 70 for, among other things, urging emulsion fluid 56 into and out of the emulsion tank 52. For example, pump system 70 can be used to pressurize the emulsion fluid 56 for delivery to the one or more spray bars 54, or could be used to draw in emulsion fluid 56 to fill the emulsion tank 52 from an external supply source that is not pressurized.

Emulsion tank 52 may also include a level indicator system 80 providing information regarding the level of emulsion fluid 56 in emulsion tank 52. For example, level indicator system 80 may include a level sensor 82, a light indicator 84, an alarm speaker 86, a display 88 on control panel 32, and a controller 95 coupled to the level sensor 82, light indicator 84, display 88, and pump system 70.

Level sensor 82 may be any appropriate type of level sensor, such as a magnetic float type level sensor that includes a stationary sensing rod 90, a magnetic float 92 movable along the sensing rod 90 based on the level of emulsion fluid 56 in the emulsion tank 52, and an electronics unit 94 outside the emulsion tank 52 for creating an output signal 96 corresponding to the position of the magnetic float 92 on the sensing rod 90. As the magnetic float 92 raises or lowers by the level of the emulsion fluid 56, the sensing rod 90 will have a resistance output that is directly proportional to the level of the emulsion fluid 56. As shown, level sensor 82 extends vertically into emulsion tank 52 with the electronics unit 94 extending above top surface 58 of the emulsion tank 52.

Light indicator 84 may be an andon light post and include a plurality of light portions 98, 100, 102, alarm speaker 86, and a pedestal 104. Light indicator 84 may extend from the top surface 58 of the emulsion tank 52 and thus be vertically above emulsion tank 52. Further, light indicator 84 may be located in a central portion of the emulsion tank between opposing sides 106, 108 of the emulsion tank 52. The light indicator 84 may be positioned in the line of sight from the operator station 30. To this end, pedestal 104 may raise light portions 98, 100, 102 so that the bottom most light portion 102 is spaced by a gap from the top surface 58 of emulsion tank 52.

The light portions 98, 100, 102 include any type of lights, such as LED lights. Further light portions 98, 100, 102 are each of different colors than one another. For example, light portion 98 may be red, light portion 100 may be green, and light portion 102 may be yellow. The red light portion 98 may be lit when the emulsion tank 52 is sensed to be full by level sensor 82. The yellow light portion 102 may be lit when the emulsion tank 52 is sensed to be low by level sensor 82—low corresponding to a impending or current need to fill the emulsion tank 52 with emulsion fluid 56. The green light portion 100 may be lit when the emulsion tank 52 is sensed by the level sensor 82 to be between full and low. It is understood that different colors may be used for the different conditions, and less or more than three light portions may be included. For example light indicator 84 could include only two light portions, corresponding to a full and low level condition.

The alarm speaker 86 may be located on a top portion of light indicator 84, above the light portions 98, 100, 102. The alarm speaker 86 can be any appropriate speaker to provide sufficient volume to be heard in the noisy environment of paving machines. Alarm speaker 86 may be configured to send an audible alarm based on the sensed level condition of the emulsion tank 52 by level sensor 82. For example, when the level sensor 82 indicates a full condition in emulsion tank 52, the alarm speaker 86 will sound. Similarly, when the level sensor 82 senses a low local condition in emulsion tank 52, the alarm speaker 86 will sound. To the extent the light indicator 84 includes a third light portion 100, it is not necessary for the alarm speaker 86 to sound when the level of the emulsion fluid 56 is between full and low. The sounds from alarm speaker 86 may be the same or different for the different conditions sensed by level sensor 82.

As referenced above, and referring to FIG. 1, level sensor may provide an output signal 96 indicative of the sensed level of emulsion fluid 56 in emulsion tank 52. This output signal 96 may be sent to controller 95 and processed to provide a signal 110 to display 88 in the operator station 30. The display may provide an indication of the actual level of emulsion fluid 56 in the emulsion tank 52. For example, the display 88 could show the actual liters of emulsion fluid 56 in emulsion tank 52, a percentage full, or show an electronic gage showing the real time level of the emulsion fluid 56.

Controller 95 may be any appropriate controller and may include any appropriate hardware and software to allow communication of the level sensor output signal 96 to other components of the paving machine 10. For example, controller 95 may provide a signal to light indicator 84 to actuate the appropriate light portion 98, 100, 102, and alarm speaker 86. Further, controller 95 may include a signal 112 to pump system 70, to actuate or termination operation of the pump system 70 based on the level of the emulsion fluid 56 in emulsion tank 52. For example, controller 95 may halt pump system 70 when the pump system 70 is pumping new emulsion fluid 56 into the emulsion tank 52 from an external source, and the level sensor 84 senses a full condition of emulsion tank 52. To the extent the pump system 70 is supplying emulsion to one or more spray bars 54, controller 95 may halt pump system 70 when the level sensor 84 senses a low condition of emulsion tank 52. While the sensor output signal 96 is described as being sent to controller 95 and then to other components of paving machine 10, it is understood that, alternatively, sensor output signal 96 could be sent directly to the other components (e.g. light indicator 84).

INDUSTRIAL APPLICABILITY

The disclosed features of paving machine 10 may be used in any paving machine to assist in properly filling and dispensing emulsion fluid from an emulsion tank.

During operation of the paving machine 10, level sensor 82 determines the level of emulsion fluid 56 in emulsion tank 52. As noted above, depending on the output from the level sensor 82, different colored lights will be illuminated on the light indicator 84 (andon light post), and an alarm will sound. Further, the location of the light indicator 84 in the line of sight from the operator station 30 can be easily seen by the operator 34 during operation of the paving machine 10. Such an emulsion tank level notification system, including level indications on the display 88 in the operator station 30, help to avoid over filling of the emulsion tank 52 and paving delays associated with insufficient emulsion quantities in the emulsion tank 52.

It will be apparent to those skilled in the art that various modifications and variations can be made to the disclosed machine without departing from the scope of the disclosure. Other embodiments of the machine will be apparent to those skilled in the art from consideration of the specification and practice of the paving machine with an emulsion tank disclosed herein. It is intended that the specification and examples be considered as exemplary only, with a true scope of the disclosure being indicated by the following claims and their equivalents.

What is claimed is:

1. A paving machine, comprising
an operator station including an operator display;
a hopper to store paving material;
a conveyor system to transfer the paving material to a dispersion system; and
an emulsion system including:
an emulsion tank to store and dispense emulsion fluid, wherein the emulsion tank is positioned between the operator station and the hopper,
a sensor to measure a level of emulsion fluid, and
a light indicator located in a forward line of sight from the operator station, wherein the forward line of sight extends from the operator station, above the emulsion tank and the hopper, to a position ahead of the paving machine, wherein the light indicator includes a first light portion signaling a tank full condition and a second light portion signaling a tank low condition.

2. The paving machine of claim 1, wherein the first light portion is a different color than the second light portion.

3. The paving machine of claim 2, wherein the operator display includes an indication in the operator station of the level of emulsion in the emulsion tank.

4. The paving machine of claim 3, further including an alarm configured to sound when the first light portion is lit.

5. The paving machine of claim 4, wherein the alarm is further configured to sound when the second light portion is lit.

6. The paving machine of claim 1, wherein the light indicator extends vertically and is located above the emulsion tank.

7. The paving machine of claim 6, wherein the emulsion tank is located adjacent and behind the hopper.

8. The paving machine of claim 7, wherein the light indicator includes a bottom-most end that is spaced from a top surface of the emulsion tank.

9. The paving machine of claim 1, further including a pump system coupled to the emulsion tank, and the operation of the pump system is controlled by the sensor.

10. The paving machine of claim 9, wherein the light indicator includes a third light portion signaling a tank condition between the tank full condition and the tank low condition.

11. A paving machine, comprising
an operator station including an operator display;
a hopper to store paving material;
a conveyor system to transfer the paving material to a dispersion system; and
an emulsion system including:
an emulsion tank to store and dispense emulsion fluid,
a sensor to measure a level of emulsion fluid,
a light indicator located in a forward line of sight from the operator station, wherein the forward line of sight extends from the operator station to a position ahead of the paving machine, wherein the light indicator extends vertically and is located at a position spaced away from and above the emulsion tank, and wherein the light indicator includes a first light portion signaling a tank full condition and a second light portion signaling a tank low condition, and
an alarm configured to sound when the first light portion is lit and when the second light portion is lit;
wherein the operator display includes an indication of the level of emulsion in the emulsion tank.

12. The paving machine of claim 11, wherein the first light portion is a different color than the second light portion.

13. The paving machine of claim 11, wherein the emulsion tank is located adjacent and behind the hopper.

14. The paving machine of claim 12, wherein the light indicator includes a bottom-most end that is spaced from a top surface of the emulsion tank.

15. The paving machine of claim 14, wherein the light indicator includes a third light portion signaling a tank condition between the tank full condition and the tank low condition.

16. A paving machine, comprising
an operator station;
a hopper positioned ahead of the operator station to store paving material;
a conveyor system to transfer the paving material to a dispersion system;

an emulsion system including:
> an emulsion tank positioned between the hopper and the operator station to store and dispense emulsion fluid,
> a sensor to measure a level of emulsion fluid,
> a light indicator extending vertically, and located above the emulsion tank, the light indicator including a first light portion of a first color signaling a tank full condition, and a second light portion of a second color signaling a tank low condition, and
> an alarm configured to sound when the first light portion is lit and when the second light portion is lit; and a display including an indicator of the level of emulsion in the tank.

17. The paving machine of claim 16, wherein the emulsion tank is located adjacent the hopper such that the light indicator is located in a forward line of sight from the operator station, wherein the forward line of sight extends from the operator station, above the emulsion tank and the hopper, to a position ahead of the paving machine.

18. The paving machine of claim 17, wherein the light indicator includes a bottom-most end that is spaced from a top surface of the emulsion tank.

19. The paving machine of claim 18, wherein the light indicator includes a third light indicator portion signaling a tank condition between the tank full condition and the tank low condition.

20. The paving machine of claim 19, wherein the third light portion includes a third color.

* * * * *